UNITED STATES PATENT OFFICE.

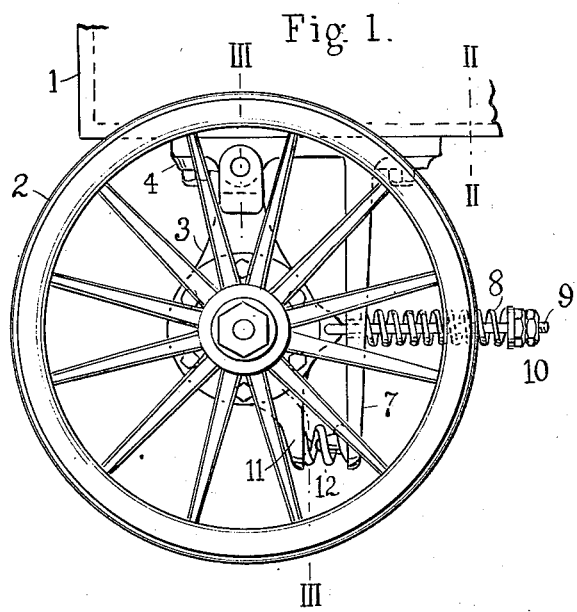
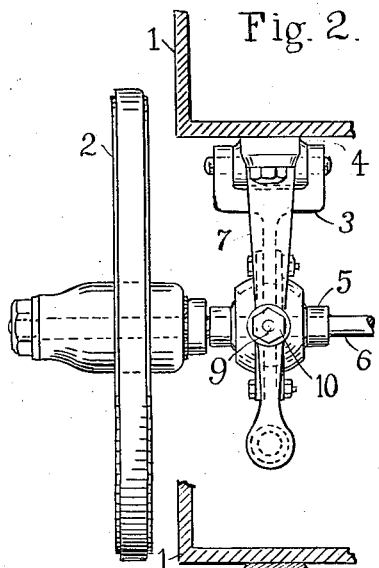
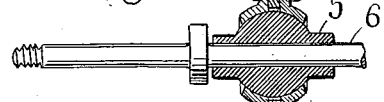
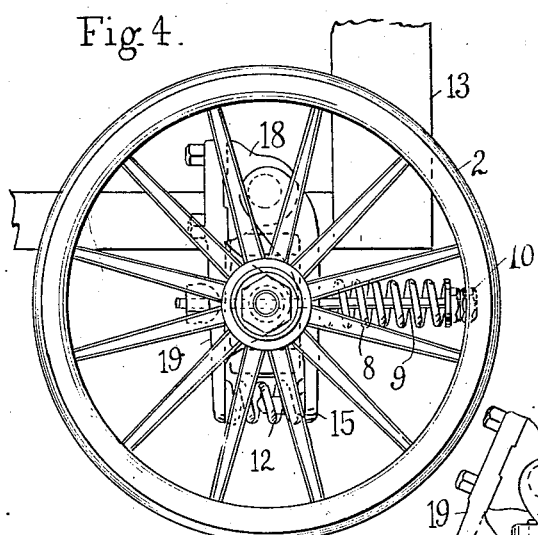
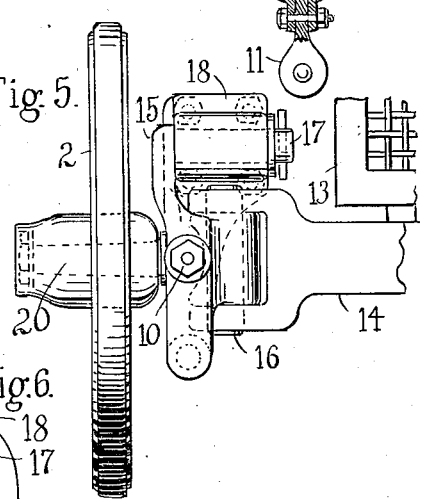
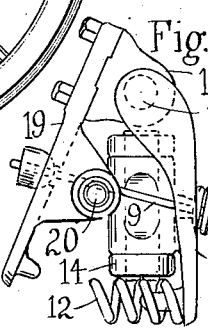

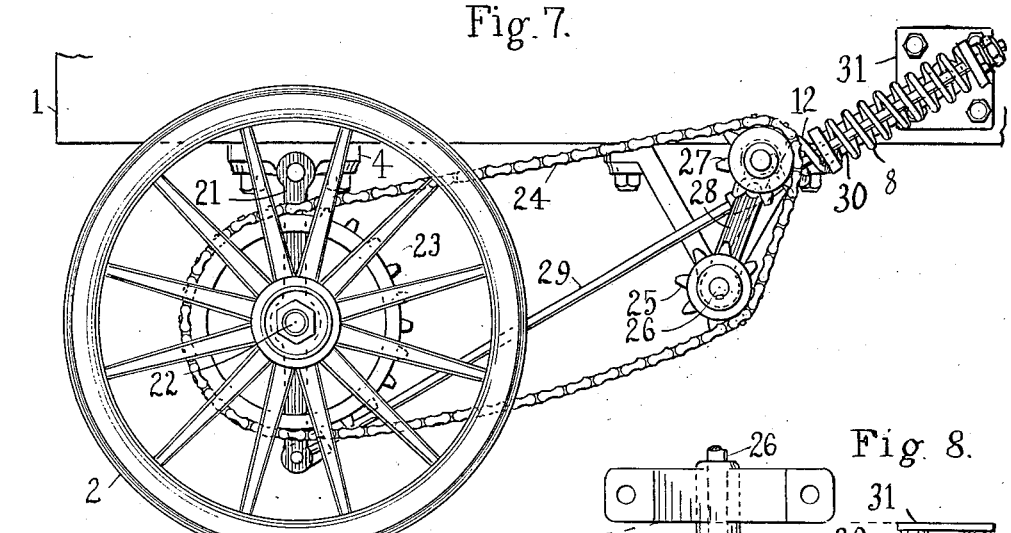
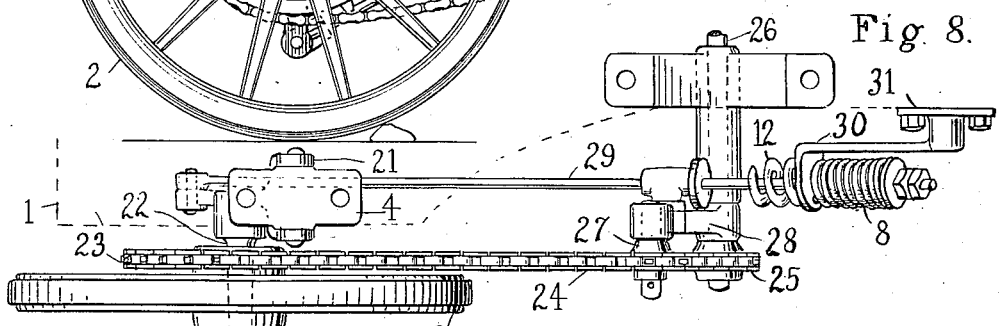
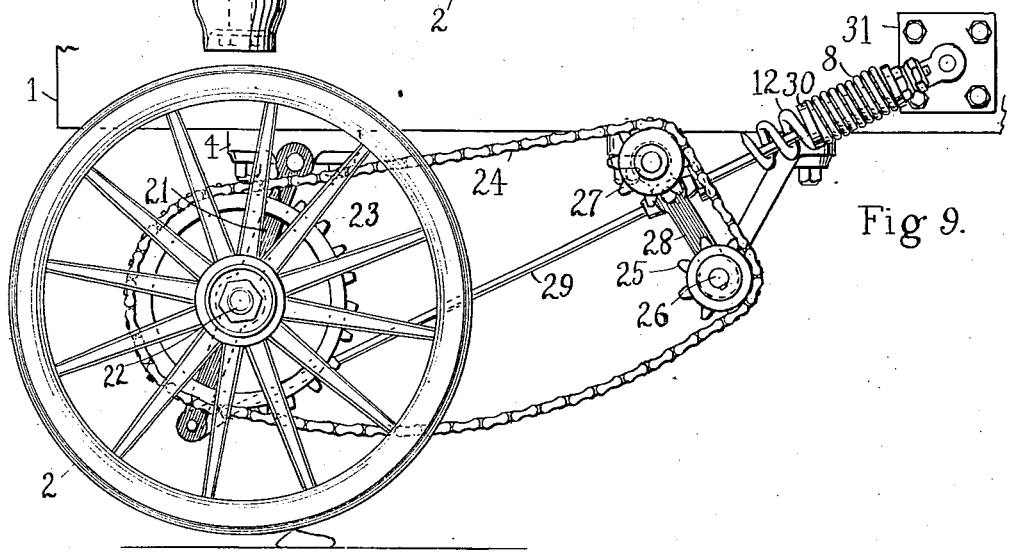

HUGH EWING, OF COLUMBUS, OHIO.

SPRING-CONTROLLED VEHICLE WHEEL-LINK.

951,096.

Specification of Letters Patent.

Patented Mar. 1, 1910.

Application filed December 2, 1908. Serial No. 465,738.

*To all whom it may concern:*

Be it known that I, HUGH EWING, a citizen of the United States of America, and a resident of the city of Columbus, county of Franklin, and State of Ohio, have invented certain new and useful Improvements in Spring-Controlled Vehicle Wheel-Links, of which the following is a specification.

This invention is applicable to wheeled vehicles of all types, whether self-propelled, as automobiles, or drawn by extraneous power, as carriages, wagons or cars, and traveling either on road or rail.

The invention has for its object to reduce the jar arising from the wheels encountering impediments in their path, and to reduce the strain and jar on the propelling means. The provision of pneumatic tires on road vehicles is thereby rendered unnecessary.

The invention consists broadly in means for permiting the rearward and upward movement of each of the wheels with respect to the body of the vehicle when encountering an obstacle on the road, or in other words, in means for permitting any wheel to stop momentarily and then rise over the obstacle without interfering with the uniform forward progress of the rest of the vehicle.

The invention further consists in means for returning the wheel to its normal position with respect to the vehicle when the obstacle has been passed over.

The invention further consists in the construction, combination and arrangement of parts, as hereinafter more fully set forth and claimed.

In the accompanying two sheets of drawings which form a part of this application, Figure 1 is a side elevation showing one form of my invention as applied to the rear wheel of a road vehicle which may be either a wagon or carriage or an automobile driven through the axle of the wheel. Fig. 2 is a section on the line II—II of Fig. 1 showing the mechanism looking rearwardly. Fig. 3 is a section on the line III—III of Fig. 1, also looking rearwardly. Fig. 4 is a side elevation showing the application of my invention to the front wheel of an automobile. Fig. 5 is a front view of the same. Fig. 6 is a side elevation of the mechanism in operated position to permit the wheel to pass over the obstruction, the wheel being omitted. Fig. 7 is a side elevation of another form of my invention applied to the rear wheel of an automobile with chain-drive for the wheel. Fig. 8 is a top view of the same, the vehicle body being omitted, and the parts being shown in the position which they take when the wheel is passing over an obstruction. Fig. 9 is a side elevation of the parts in the position of the preceding figure.

In the form shown in Figs. 1, 2 and 3, the rear of the vehicle body 1 is supported from a running wheel 2 through a normally vertical link 3, the upper end of which is pivoted to a bearing-block 4 under the vehicle-body, and the lower end of which engages a bearing 5 for the axle 6 which is carried by the running wheel. The connection between the link and bearing for the axle is a ball-and-socket joint which permits the link to swing rearwardly independently of a similar link connecting the axle with the vehicle-body on the other side of the vehicle, and permits either wheel independently of the wheel at the other end of the axle, to be displaced with respect to the vehicle-body when encountering an obstruction along a rearwardly and upwardly curving path. An arm 7 rigidly depending from the vehicle-body in front of the link serves as an abutment for a compression-spring 8. The spring is connected to the link through a rod 9 which passes loosely through a hole in the downwardly projecting arm. One end of the rod engages an eye in the side of the link and the other end is provided with nuts 10 which serve as the other abutment for the spring and afford a means for a change of pressure to adapt the invention to the conditions under which it is used. This spring opposes the displacement rearwardly and upwardly of the lower end of the link, wheel axle and running wheel, and when they have been so displaced, serves to return the link to its normally vertical position. An arm 11 of the link which is carried below the point of engagement of the link with the axle bearing, lies opposite the lower end of the depending arm, and material displacement of the link forward beyond the vertical is prevented thereby. Forcible impact on the return to the vertical position after having been swung rearwardly is prevented by a buffer which may be of any suitable character and is shown in the form of a short, stiff compression-spring 12. This form of my invention may be employed substantially as above detailed either with a horse-drawn vehicle, in which case the running wheel will preferably run free on the ends of the axle, or it may be embodied in an automobile in which the power transmission is through the axle to the running wheel.

In the form of Figs. 4, 5 and 6 is shown a portion of the forward end of an automobile, one corner of the radiator 13 appearing and supported from the running wheel 2 through a cross-bar 14, having at either end a steering-knuckle 15 hinged thereto through a vertical pivot 16, as is usual in automobile construction. This knuckle carries a horizontally disposed trunnion 17. The trunnion carries a bearing block 18 which is bolted to a spring-controlled bracket 19 having a trunnion or axle 20 on which the running wheel turns. The bearing block and bracket form a spring-controlled link between the running wheel and the steering-knuckle. The axis of the steering-knuckle trunnion is normally substantially over the axis of the running wheel axle so that the link is pivoted normally substantially over the axle.

In the form shown in Figs. 7, 8 and 9 the vehicle-body 1 is supported from the running wheel 2 through a normally vertical link 21, the upper end of which is pivoted to a bearing block 4 under the vehicle-body and permits the link to swing rearwardly as in Fig. 9. The wheel is chain-driven and runs on an axle 22, rigidly carried by the link. A sprocket-wheel 23 attached to the wheel receives the power through a chain 24 from a sprocket 25 on a power shaft 26 which receives power from the engine. In order that the chain may not interfere with the rearward swinging of the link and running wheel, an idler 27 is provided for the chain and carried on an arm 28 which swings about the power shaft. The arm and an extension of the link which swings with the running wheel are joined by a connecting rod 29 so that they will swing relatively to each other in such manner that the slack of the chain will be sufficiently taken up in all positions of the link. The rearward displacement of the link is opposed by a compression spring 8 the force of which is conveniently transmitted through an extension of the connecting rod. The rod passes through an abutment link 30 which is hinged to a plate 31 carried by the vehicle-body. This abutment link supports the compression spring. A stiff spring 12 is conveniently placed on the opposite side of the ear of the abutment link through which the rod passes, with one end attached to the ear to serve as a buffer when the link between the running wheel and vehicle-body returns to its normal vertical position. The idler sprocket, it will be seen, engages the driving side of the chain. By reason of this and the connection between the idler arm and link, the effect of the power transmission is neutralized so that the link will swing rearwardly and upwardly with substantially the same freedom, irrespective of whether or not power is being transmitted through the chain. Furthermore, the rearward swing of the idler sprocket permits the running wheel to slow down or stop momentarily when first encountering an obstruction without interfering with the uniform forward progression of the vehicle-body.

The operation of the invention is as follows. When the vehicle is moving forward rapidly and one of the wheels strikes an obstruction, as a stone in the road, that wheel is stopped momentarily in its forward movement, but, by reason of the swinging link connection, the vehicle-body continues forward unchecked and without appreciable jar being communicated thereto while the wheel displaces with respect to the body, first rearwardly and horizontally, and then, following a curved path, rises without lifting the vehicle-body and passes over the obstruction. The spring connected with the link then returns the parts to their normal position and the buffer arrests them without jar. With this invention heavy loads are more easily started, since the vehicle-body can move forward and acquire momentum before the wheels need to move, and an obstructed wheel will rise over the obstruction without lifting or stopping the vehicle.

What I claim as new and desire to secure by Letters Patent of the United States is:

1. In a vehicle, the combination of a wheel-axle, a body, a spring-controlled supporting link for the body carried upon the wheel-axle, said link being pivoted substantially vertically over the wheel-axle and normally maintained in said position by its spring control.

2. In a vehicle, the combination of a wheel-axle, a body, a supporting link for the body carried upon the wheel-axle, the link being pivoted substantially vertically over the wheel axle, and a spring which is normally relieved from the weight of the body for controlling the movement of the link upon its pivot, substantially as described.

3. In a vehicle, the combination of wheels and a wheel-axle, a body, a supporting link for the body carried upon the wheel-axle, the link being pivoted substantially vertically over the wheel-axle and permitting the wheel-axle to displace along a rearwardly and upwardly curving path when a wheel strikes an obstruction, and a spring for opposing the displacement of the link, substantially as described.

4. In a vehicle, the combination of wheels and a wheel-axle, a body, a supporting link for the body carried upon the wheel-axle, the link being pivoted substantially vertically over the wheel-axle and permitting the wheel-axle to displace along a rearwardly and upwardly curving path when a wheel strikes an obstruction, a spring for opposing the displacement of the link, and means for preventing corresponding forward displacement, substantially as described.

5. In a vehicle, the combination of wheels and a wheel-axle, a body, a supporting link for the body carried upon the wheel-axle, the link being pivoted substantially vertically over the wheel axle and permitting the wheel-axle to displace along a rearwardly and upwardly curving path, when a wheel strikes an obstruction, a spring opposing the displacement of the link, and a buffer for preventing corresponding forward displacement substantially as described.

6. In a power-driven vehicle, the combination of a wheel-axle, a body, a spring-controlled supporting link for the body carried upon the wheel-axle, said link being pivoted substantially vertically over the wheel-axle, a running wheel and sprocket connected therewith carried by the wheel-axle, a chain transmission, a movable idler, and means connected with the link for controlling the movement of the idler, whereby the slack of the chain will be taken up in all positions of the link, substantially as described.

7. In a power-driven vehicle, the combination of a wheel-axle, a body, a spring-controlled supporting link for the body carried upon the wheel-axle, said link being pivoted substantially vertically over the wheel-axle, a running wheel and sprocket connected therewith carried by the wheel-axle, a chain transmission, a movable idler in engagement with the driving side of the chain, and means connected with the link for controlling the movement of the idler, whereby the slack of the chain will be taken up in all positions of the link, substantially as described.

Signed by me at Columbus, Ohio, this 30th day of November, 1908.

HUGH EWING.

Witnesses:
EDWARD H. JACOBS,
JOHN D. SULLIVAN.